Patented Apr. 7, 1953

2,634,294

UNITED STATES PATENT OFFICE 2,634,294

PREPARATION OF AROMATIC KETO ALCOHOLS

John Mann Butler, Centerville, Ohio, assignor to Monsanto Chemical Company, St. Louis, Mo., a corporation of Delaware No Drawing. Application April 8, 1950,
Serial No. 154,889

4 Claims. (Cl. 260—592)

This invention relates to nuclearly acylated aralkyl carbinols and it comprises, as new compounds, hydroxy ketones having the generic structure:

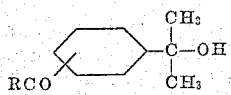

wherein R is an alkyl radical of from 1 to 4 carbon atoms.

I have discovered a new class of compounds which can be readily prepared from certain alkyl p-isopropylphenyl ketones and which have chemical and physical properties of decided interest to various industries, particularly the synthetic resin, the perfume and the pharmaceutical industries. I have found that alkyl isopropylphenyl ketones in which the alkyl group contains from 1 to 4 carbon atoms can be caused to react with hydrocarbon hydroperoxides to yield nuclearly acylated $\alpha,\alpha$-dimethylbenzyl alcohols. The new alcohols are oily liquids which are stable at ordinary pressures and temperatures. They are of importance as starting materials for the preparation of monomeric material useful for the production of synthetic resins, elastomers, etc., as disclosed in my copending application, Serial No. 154,890, filed April 8, 1950.

I prepare the new, nuclearly acylated $\alpha,\alpha$-dimethylbenzyl alcohols by contacting an alkyl isopropylphenyl ketone with a hydrocarbon hydroperoxide, the reaction proceeding substantially according to the scheme.

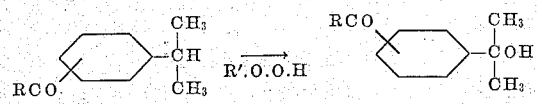

in which R is an alkyl group of from 1 to 4 carbon atoms and R' is an aliphatic, alicyclic or aralkyl hydrocarbon residue. Alkyl isopropylphenyl ketones useful for the present purpose include p-isopropylacetophenone, o-isopropylacetophenone, p-isopropylpropiophenone, m-isopropylacetophenone, m-isopropylbutyrophenone, p-isopropylisobutyrophenone, p-isopropylvalerophenone, and p-isopropylisovalerophenone. As illustrative of hydrocarbon hydroperoxides which may be reacted with the alkyl isopropylphenyl ketones may be mentioned tert.-butyl hydroperoxide, cymene hydroperoxide, cumene hydroperoxide, tetralin hydroperoxide, cyclohexene hydroperoxide, etc. Hydroperoxides of aliphatic, alicyclic or alkylaromatic hydrocarbons having a tertiary carbon atom are preferably employed. Inasmuch as the hydrocarbon portion of the hydroperoxide does not enter into the formation of the new hydroxy ketones, the nature of the hydrocarbon radical in the hydroperoxide is relatively immaterial; tertiary-alkyl or aralkyl hydroperoxides are preferred, however, because they are readily prepared and stable at ordinary atmospheric conditions. Compounds provided by the present invention are o, p, and m-acetyl-$\alpha,\alpha$-dimethylbenzyl alcohol, o, p, and m-propionyl-$\alpha,\alpha$-dimethylbenzyl alcohol, o, p, and m-butyryl-$\alpha,\alpha$-dimethylbenzyl alcohol, o, p, and m, isobutyryl-$\alpha,\alpha$-dimethylbenzyl alcohol, o, p, and m-valeroyl-$\alpha,\alpha$-dimethylbenzyl alcohol, and o, p, and m-isovaleroyl-$\alpha,\alpha$-dimethylbenzyl alcohol.

Reaction of the alkyl isopropylphenyl ketone with the hydrocarbon peroxide may be generally effecting by contacting the ketone with varying proportions of the hydroperoxide at ordinary or increased temperatures for a time of from, say, a few minutes to several hours, in the presence or absence of a basically-reacting material.

The reaction product generally comprises a mixture of unreacted ketone, the nuclearly acylated $\alpha,\alpha$-dimethylbenzyl alcohol, nuclearly acylated acetophenone and various reduction products of the hydroperoxide.

The aralkyl keto-alcohol together with the co-distilling diketone may be readily separated by fractional distillation. Crystallization of the diketone generally serves to remove it from the aralkyl keto-alcohol.

Though some acylated $\alpha,\alpha$-dimethylbenzyl alcohol is formed regardless of the relative quantities of the hydroperoxide with respect to the ketone, for example from less than 10 per cent to 500 per cent of hydroperoxide based on the weight of the ketone, better yields of the nuclearly acylated aralkyl alcohol are obtained when the molar ratio of ketone to hydroperoxide is at least 1:1 and most advantageously from 2:1 to 10:1. While I do not know the mechanism of the reaction underlying hydroxylation of the ketone, it is believed that the reaction is one which involves oxidation of the isopropyl radical, and that the oxidation proceeds with the formation of the nuclearly acylated aralkyl alcohol and a further oxidation product which is a nuclearly acylated acetophenone, i. e., a diketone.

The presence of a basically-reacting material helps to neutralize acid materials which may be formed in trace amounts during the reaction, and which, if allowed to build up, can cause decomposition of the hydroperoxide, and possibly dehydration and polymerization of the product tertiary alcohol. However, it is not necessary that a basically-reacting material be present, and the reaction can be carried out in the absence of such material. The temperature required for the reaction depends upon the ease of decomposition of the hydroperoxide employed. Generally very good conversion of the original ketone to the nuclearly acylated alcohol is obtained by heating at temperatures of from 100° C. to 160° C. for a time of from 1 hour to 6 hours.

The basic agent which may be employed may be any inorganic or organic basically reacting material, e. g., a hydroxide, carbonate or bicarbonate of an alkali or alkaline earth such as sodium, potassium, or lithium, a salt of an inorganic alkaline hydroxide and an organic acid, e. g., sodium acetate, a quaternary ammonium base such as trimethylamine, pyridine, etc. The basic material may be employed in small quantities, i. e., in amounts of from, say, 0.05 per cent to 5.0 per cent by weight of the total weight of the reactants; good conversion is obtained when the base content of the reaction mixture is from 0.5 per cent to 1 per cent of the total weight of the starting ketone and the hydroperoxide.

The invention is further illustrated, but not limited, by the following examples:

Example 1

A mixture consisting of 242.9 g. of methyl 4-isopropylphenyl ketone, 109.3 g. of cumene hydroperoxide and 4.8 g. of sodium bicarbonate was heated at a temperature of from 140° C. to 160° C. for a time of 5 hours. Distillation of the resulting reaction mixture gave a low-boiling by-product, unreacted methyl isopropylphenyl ketone, and 44.0 g. p-acetyl-$\alpha,\alpha$-dimethylbenzyl alcohol, B. P. 125° C./2 mm., $n_D^{26}$=1.5335, from which upon cooling there crystallized out a small quantity (3.2 g. of p-diacetylbenzene. The yield of p-acetyl-$\alpha,\alpha$-dimethylbenzyl alcohol was 81 per cent based on the methyl isopropylphenyl ketone consumed.

Example 2

A mixture consisting of 123 g. methyl 3-isopropylphenyl ketone, 56.4 g. of cumene hydroperoxide (commercial 70% grade) and 3 g. of sodium bicarbonate was heated for 5 hours at a temperature of 140 to 160° C. Fractionation of the resulting reaction product yielded 43 g. of a mixture of acetophenone and $\alpha,\alpha$-dimethylbenzyl alcohol, 85.1 g. of unreacted methyl 3-isopropylphenyl ketone and 29.7 g. of m-acetyl-$\alpha,\alpha$-dimethylbenzyl alcohol. The yield of the alcohol was 79 per cent, based on the methyl 3-isopropylphenyl ketone consumed in the reaction.

Other nuclearly acylated $\alpha,\alpha$-dimethylbenzyl alcohols, e. g., p-propionyl-$\alpha,\alpha$-dimethylbenzyl alcohol and p-butyryl-$\alpha,\alpha$-dimethylbenzyl alcohol were similarly prepared.

What I claim is:

1. The process of preparing a nuclearly acylated $\alpha,\alpha$-dimethylbenzyl alcohol in which the acyl radical has from 2 to 5 carbon atoms which comprises transferring oxygen from a tertiary hydrocarbon hydroperoxide to an alkyl isopropylphenylketone in which the alkyl radical has from 1 to 4 carbon atoms by heating said hydroperoxide with said ketone at a temperature which is above the decomposition point of said hydroperoxide and below the decomposition points of said ketone and said alcohol, in the presence of a basically reacting agent and in the absence of an oxidizing catalyst, said heating being conducted until substantially all of said hydroperoxide has been decomposed.

2. The process of preparing ar-acetyl-$\alpha,\alpha$-dimethylbenzyl alcohol which comprises transferring oxygen from a tertiary hydrocarbon hydroperoxide to a methyl isopropylphenyl ketone by heating said ketone with said hydroperoxide at a temperature which is above the decomposition point of said hydroperoxide and below about 160° C., in the presence of a basically reacting agent and in the absence of an oxidizing catalyst, said heating being conducted until substantially all of said hydroperoxide has been decomposed.

3. The process of preparing ar-acetyl-$\alpha,\alpha$-dimethylbenzyl alcohol which comprises transferring oxygen from cumene hydroperoxide to a methyl isopropylphenyl ketone by heating said ketone with said hydroperoxide at a temperature of 140° C. to 160° C., in the presence of a basically reacting agent and in the absence of an oxidizing catalyst, said heating being conducted until substantially all of said hydroperoxide has been decomposed.

4. The process of preparing 4-acetyl-$\alpha,\alpha$-dimethyl benzyl alcohol which comprises transferring oxygen from cumene hydroperoxide to methyl 4-isopropylphenyl ketone by heating said ketone with said hydroperoxide at a temperature of from 140° C. to 160° C., in the presence of sodium bicarbonate and in the absence of an oxidizing catalyst, said heating being conducted until substantially all of said hydroperoxide has been decomposed.

JOHN MANN BUTLER.

REFERENCES CITED

The following references are of record in the file of this patent:

UNITED STATES PATENTS

| Number | Name | Date |
|---|---|---|
| 2,438,125 | Lorand et al. | Mar. 23, 1948 |
| 2,495,904 | Pines et al. | Jan. 31, 1950 |

FOREIGN PATENTS

| Number | Country | Date |
|---|---|---|
| 540,370 | Great Britain | Oct. 15, 1941 |

OTHER REFERENCES

Vandenberg et al., Ind. Eng. Chem., vol. 40, pp. 932-37 (1948).